March 21, 1950 C. G. MUEHLFELD 2,501,475
HEN'S NEST
Filed April 17, 1947 2 Sheets-Sheet 1
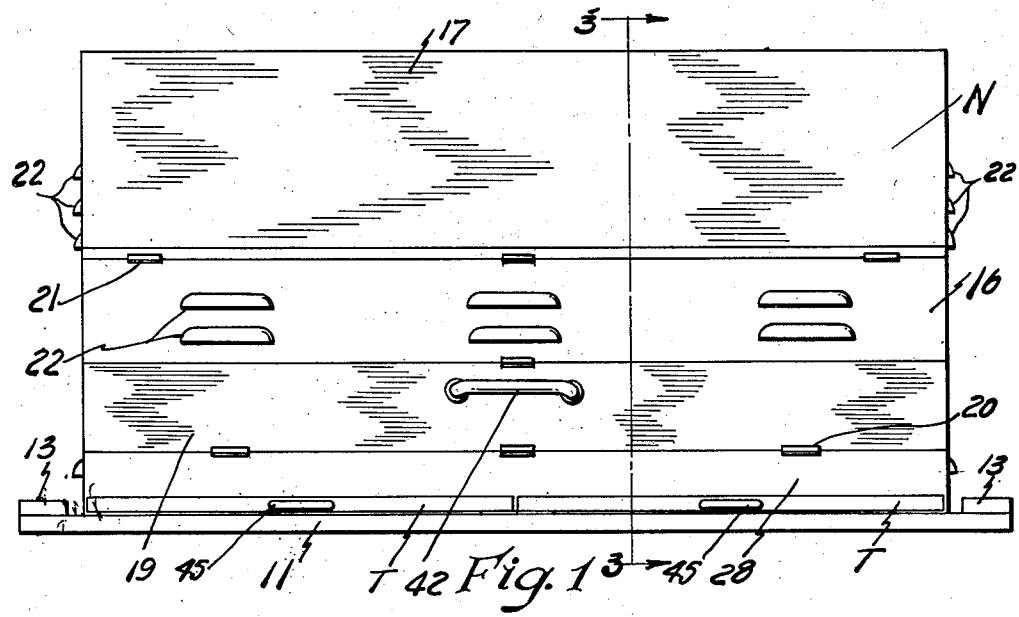
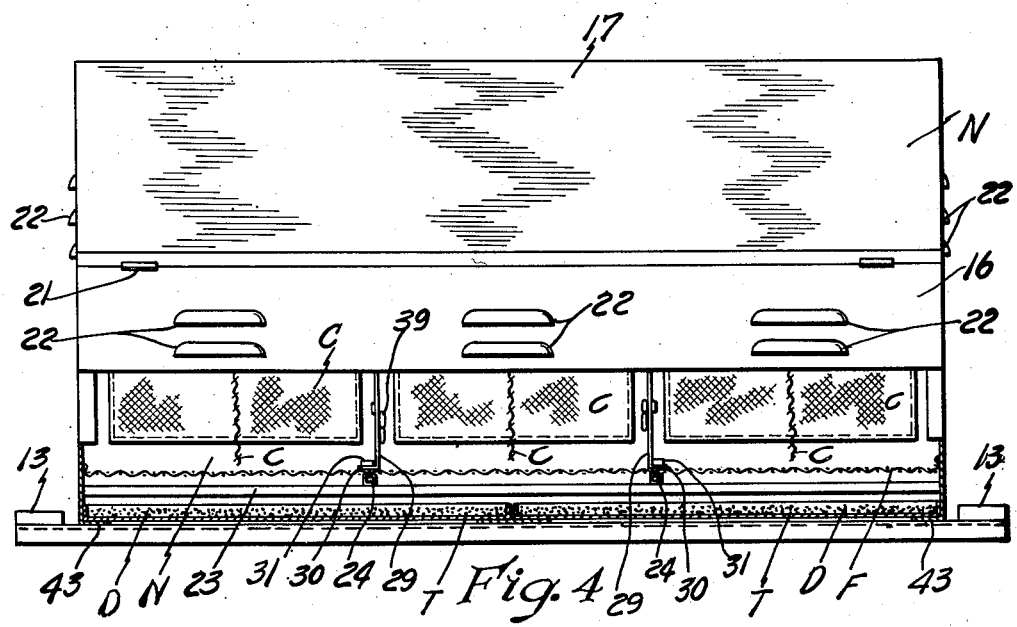
INVENTOR.
Clarence G. Muehlfeld
BY Frank C. Yeoman
ATTORNEY March 21, 1950 C. G. MUEHLFELD 2,501,475
HEN'S NEST
Filed April 17, 1947 2 Sheets-Sheet 2
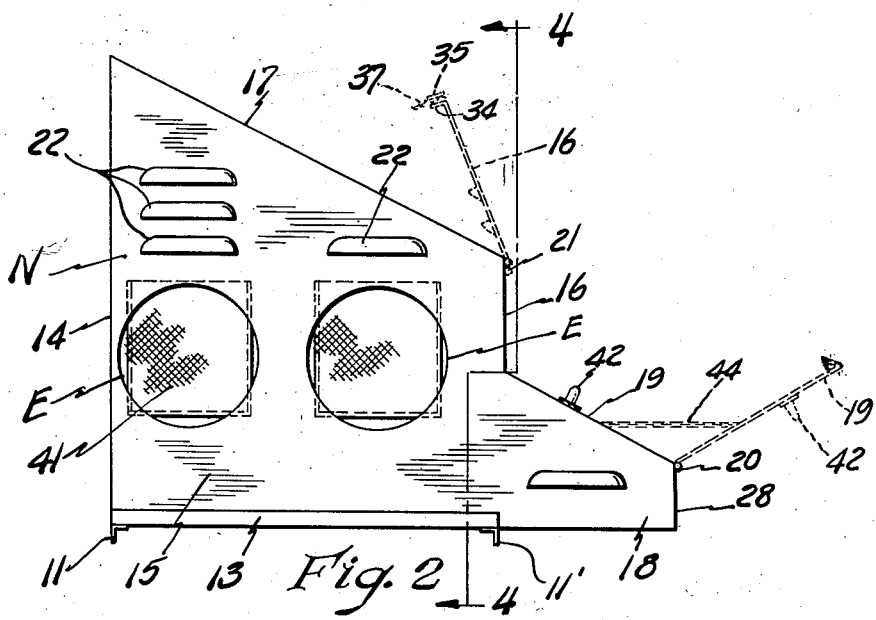
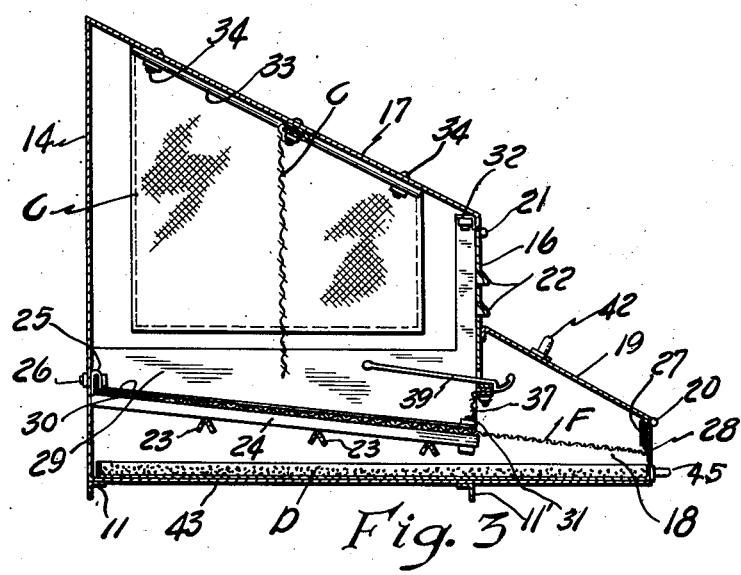
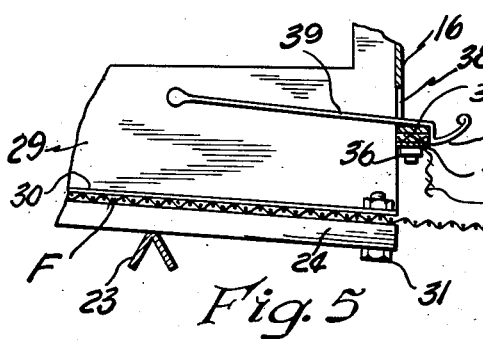
INVENTOR.
Clarence G. Muehlfeld
BY
Frank C. Fearman
ATTORNEY Patented Mar. 21, 1950

2,501,475

UNITED STATES PATENT OFFICE 2,501,475

HEN'S NEST

Clarence G. Muehlfeld, Bridgeport, Mich.

Application April 17, 1947, Serial No. 742,146

11 Claims. (Cl. 119—48)

This invention relates to hen's nests used on poultry farms in general.

One of the salient objects of the invention is to design a hen's nest structure of simple, practical, and economical construction, which can be mounted on a wall or other support and into which the hens enter to lay eggs, the floor being so designed that the egg automatically rolls, by gravity, from beneath the hen into an open compartment as soon as it is laid, thus immediately dissipating the body heat of the hen, keeping the eggs clean, as well as eliminating accidental breakage caused by the hen's moving about in the nest.

Another object is to provide a hen's nest which in reality is a community nest accommodating a large number of hens simultaneously, and which is provided with flexible curtains designed to darken the interior of the structure and divide it into a plurality of communicating chambers or compartments.

A further object is to provide a structure having an inclined, perforated floor and readily removable trays positioned therebeneath, and in which sawdust or similar material is placed, so that accidentally broken and/or soft shelled eggs and/or debris will fall into the sawdust, the trays being emptied and clean sawdust substituted from time to time as desired.

A further object still is to provide an egg compartment spaced from but communicating with the nest compartments so that the eggs may be gathered without disturbing the hens in the nests, and provide hingedly connected doors for easy and quick access to the interior of the nest structure and the egg compartment respectively.

Still a further object is to provide a nest structure that can be readily and economically manufactured and assembled without the use of skilled labor, etc.

A further object is to provide a hen's nest which can be maintained clean and sanitary with a minimum of labor and from which the trays can be easily and quickly removed for removal of dirty sawdust and refilling with clean material.

With the above and other objects in view, the present invention consists in the combination and arrangement of parts, hereinafter more fully described, illustrated in the accompanying drawings, and more particularly pointed out in the appended claims, it being understood that changes may be made in the form, size, proportions, and minor details of construction, without departing from the spirit, or sacrificing any of the advantages of the invention.

In the drawings:

Fig. 1 is a front-elevational view of my improved hen's nest structure.

Fig. 2 is an end-elevational view thereof, the broken lines showing the door and egg compartment cover swung to raised positions.

Fig. 3 is a transverse-sectional view taken on the line 3—3 of Fig. 1.

Fig. 4 is a part-sectional, front-elevational view taken on the line 4—4 of Fig. 2.

Fig. 5 is an enlarged, fragmentary, sectional view showing the means for latching the door in locked position.

Referring now to the drawings in which I have shown the preferred embodiment of my invention. The letter "N" designates the nest housing which can be mounted on a wall or brackets (not shown); this can be constructed of sheet metal, wood, or any other desired material, and I prefer to use sheet metal which is vermin and insect proof, non-inflammable, and which requires a minimum of repair or upkeep.

In the instant application the housing includes spaced apart longitudinally disposed angles 11 and 11' and transversely disposed strips 13 span said angles, and are secured thereto in any desired manner, these strips also forming a ledge onto which the hens jump preparatory to entering and leaving the nest.

The nest housing comprises a back wall 14, end and front walls 15 and 16 respectively, and an angularly disposed top 17 forms a cover for the structure, the front wall 16 being in the form of a hinged door. A projecting section 18 forms an integral part of the housing and projects beyond the end wall 16, and an inclined cover 19 is hingedly connected thereto at the point 20, the free edge of the cover bearing against the door member 16 which is hingedly connected to the structure at the point 21, and louvers 22 are provided on the door and end walls respectively for ventilation purposes.

A plurality of spaced-apart transversely disposed floor supports or angles 23 are secured to the end walls in any desired manner, and longitudinally spaced members 24 are mounted thereon, an outwardly pitched screen floor F being mounted on said members, the rear edge being secured in a turned member 25 which is secured to the back wall by means of bolts 26 or the like, the front edge being secured by the turned edge 27 of the strip 28 which forms the front wall of the egg compartment.

Spaced-apart partitions 29 are mounted on the screen F in vertical alignment with the strips 24, the lower edges being turned as at 30, and bolts 31 serve to secure them in position, similar turned edges 32 being provided at the top for a similar purpose.

The main body portions of these partitions 29 are open as clearly shown in Fig. 3 of the drawings and form a means for communication between the compartments, the open section being partially closed by means of a flexible curtain C, and a strip or plate 33 engages said curtain and is secured to the top of the housing by means of bolts 34, the open space at the lower end and edges of the curtain providing space to accommodate the hen's head and neck so that she readily climbs from one compartment to the next.

Similar transversely disposed flexible curtains are secured to the top in the same manner as above described, these curtains dividing the compartments into two sections, and it will be noted that the curtain does not extend to the face of the screen, so that the hen will not be timid about moving from one section to the other, and here again, the curtain serves to darken the compartment and create the atmosphere of a somewhat hidden nest.

The lower edge of the door 16 is flanged as at 34, and a strip 35 is secured to the lower edge thereof by means of bolts 36, this strip serving to secure a flexible strip 37, the edge of which hangs in close proximity to the face of the screen F and serves to retard the rolling movement of the eggs as they roll, by gravity, into the egg compartment.

Openings 38 are provided in the door 16 adjacent the lower edge as shown in Fig. 5, and one end of a flexible lock strip 39 is welded to the side wall of each partition panel, the free end being hook-shaped as at 40 and extending through the opening 38 and serves to lock the door in its closed position.

Entrance openings E are provided in the end walls 15 of the structure, and curtains 41 serve to partially cover the openings to shade and exclude light from the interior, and a handle 42 is provided on the door 16 to facilitate manipulation thereof.

Transversely disposed strips 43 span the bottom of the structure and form tracks on which the trays T are slidably mounted, these trays sliding beneath the screen floor F and are filled with sawdust or similar material D, and handles 45 are provided on the front of the trays so that they can be readily inserted and removed.

Chains 44 are provided as shown and are connected to the side walls of the egg compartment and the cover 19 to limit the outward swing thereof. The structure is designed to accommodate a large number of hens, all laying at the same time, and the eggs can be gathered once each day, or when desired without disturbing the hens in the nest.

From the foregoing description, it will be obvious that I have perfected a very simple, practical, and relatively inexpensive community hen's nest which accommodates a large number of hens, all laying at the same time, and in which the egg may roll, by gravity, into an elongated egg compartment, immediately it is laid, so that the egg remains clean and the body heat of the hen is promptly dissipated.

What I claim is:

1. A hen's nest comprising, a housing having a nest compartment, an egg compartment forming an extension of the nest compartment, an inclined framework spaced above the bottom of the nest compartment, a stationary inclined screen floor mounted on said framework and completely covering the interior of the housing, end walls of the housing having entrance openings, longitudinal and transversely disposed, flexible curtains hung in said nest compartments with their lower edges spaced above the screen floor to permit chickens to freely move about in said compartment, and flexible means forming a readily displaceable, partial covering for said entrance openings.

2. A hen's nest comprising a closed housing having a raised, inclined framework therein, entrance openings in the end walls thereof, an egg compartment forming an extension of said housing, a stationary screen floor tightly stretched over said framework and extending into and forming a continuous floor in said housing and egg compartment, partitions in said housing and dividing it into individual compartments, said partitions having openings to permit hens to freely pass from one compartment to another, longitudinal and transversely disposed, flexible curtains hung in each compartment with their lower edges spaced above the surface of the screen floor, a door forming the entire front wall of the compartments and separating them from the egg compartment, a flexible strip hung on the lower edge of the door with its lower end extending a predetermined distance from the face of the screen floor, and an inclined, hinged cover forming a closure for said egg compartment and bearing against the door of the housing.

3. The combination as defined in claim 2 in which readily displaceable, flexible curtains are hung in the openings in the partitions, said curtains being of a size to normally leave open space between the sides and lower edges of the curtains, and the edges of the opening in each partition.

4. The combination defined in claim 2 in which an elongated, forwardly-projecting, resilient locking member is provided on certain of said partition panels for releasably locking the door when it is swung down to closed position.

5. A hen's nest of the class described comprising, a housing having entrance openings in the end walls thereof, a raised, pitched screen floor in said housing, spaced-apart partitions in said housing and dividing it into individual compartments, each partition having an opening, a flexible, readily displaceable curtain partially covering the opening in each partition and of a length and width to provide an open space at the bottom and side edges thereof, longitudinally and transversely disposed flexible curtains hung in each compartment and spaced above the screen and from the walls of the housing, an egg compartment forming an extension of the nest compartments, a door forming the front wall of the nest compartments and having a flexible strip on the lower end thereof with its free end spaced a predetermined distance above the screen, and separating the nest compartments from the egg compartment, means on the partitions for releasably and automatically securing said door, and an inclined cover forming a closure for the egg compartment and bearing against said door when the members are in closed position.

6. The combination set forth in claim 5 in which a plurality of spaced-apart bars are provided in the housing to support the screen floor above the bottom wall of the housing, a turned binding strip bolted to the back wall of the nest compartment and in which one end of the screen in secured, and a turned edge on the front wall of the egg compartment for securing the opposite end of said screen.

7. The combination defined in claim 5 in which readily displaceable flexible curtains form a partial closure for the entrance openings, said curtains being of a size to permit entrance of a chicken's head between the edge of the opening and the lower edge of the curtain.

8. A hen's nest comprising a closed housing including longitudinally disposed members projecting beyond the end wall of the housing, transversely disposed strips spanning said members adjacent the end walls thereof, entrance openings in the end walls, partitions in said housing and dividing it into individual compartments, each partition having openings to afford access from one compartment to another, flexible curtains partially closing the openings in each partition, an inclined framework in said housing spaced a predetermined distance above the bottom thereof, an egg compartment forming an extension for the lower end of the housing, a screen mounted on said framework and detachably secured to the rear wall of the housing and the front wall of the egg compartment respectively to form a continuous, uniformly pitched floor, a hinged door forming a closure for the front end of the housing proper, with its lower edge spaced a predetermined distance above said screen, a strip secured to the lower edge of said door, and a resilient hook member secured to certain of said partitions and releasably engageable with said strip for securing the door in closed position.

9. The combination set forth in claim 8 in which bars are bolted to the top wall of the housing for clamping the flexible curtains to said top wall.

10. A hen's nest comprising a closed housing including an inclined top, a hinged door forming a closure for the front wall thereof with the lower edge of the door spaced a predetermined distance from the bottom, an egg compartment extending ahead of said door and forming a continuation of the lower section of the housing, an inclined door forming a cover and openable closure for said egg compartment, an inclined sub-frame mounted in said housing and spaced above the bottom thereof, an inclined screen stretched over said sub-frame and detachably secured to the back wall of the compartment and to the front wall of the egg compartment respectively, spaced partition plates dividing the housing into individual compartments, each partition plate having openings to permit access from one compartment to another, flexible curtains forming a partial closure for said partition openings, an elongated opening in the front wall of the egg compartment, and a sawdust drawer slidably mounted therein and covering the entire area beneath the housing and egg compartment respectively.

11. The combination defined in claim 10 in which oppositely disposed curtains are hung in each compartment with the lower and side edges of the curtains spaced a predetermined distance from the housing walls and above the face of the screen.

CLARENCE G. MUEHLFELD.

REFERENCES CITED

The following references are of record in the file of this patent:

UNITED STATES PATENTS

| Number | Name | Date |
|---|---|---|
| 680,821 | Tremere | Aug. 20, 1901 |
| 694,759 | Lathrop | Mar. 4, 1902 |
| 1,037,756 | Greene et al. | Sept. 3, 1912 |
| 1,175,638 | Kemble | Mar. 14, 1916 |
| 1,402,790 | Olson | Jan. 10, 1922 |
| 1,721,649 | Tweet | July 23, 1929 |
| 1,810,278 | Kielsmeier | June 16, 1931 |
| 1,817,588 | Shaffer | Aug. 4, 1931 |
| 1,914,160 | Pine | June 13, 1933 |
| 1,925,456 | Muehr | Sept. 5, 1933 |
| 2,279,147 | Stimson | Apr. 7, 1942 |